US009645942B2

United States Patent
Zyulkyarov et al.

(10) Patent No.: US 9,645,942 B2
(45) Date of Patent: May 9, 2017

(54) METHOD FOR PINNING DATA IN LARGE CACHE IN MULTI-LEVEL MEMORY SYSTEM

(71) Applicant: Intel Corporation, Santa Clara, CA (US)

(72) Inventors: Ferad Zyulkyarov, Barcelona (ES); Nevin Hyuseinova, Barcelona (ES); Qiong Cai, Barcelona (ES); Blas Cuesta, Barcelona (ES); Serkan Ozdemir, Barcelona (ES); Marios Nicolaides, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 13/976,181

(22) PCT Filed: Mar. 15, 2013

(86) PCT No.: PCT/US2013/032474
§ 371 (c)(1),
(2) Date: Jun. 26, 2013

(87) PCT Pub. No.: WO2014/143036
PCT Pub. Date: Sep. 18, 2014

(65) Prior Publication Data
US 2015/0227469 A1    Aug. 13, 2015

(51) Int. Cl.
*G06F 12/00* (2006.01)
*G06F 12/1045* (2016.01)
*G06F 12/0897* (2016.01)
*G06F 12/126* (2016.01)
*G06F 12/0895* (2016.01)

(52) U.S. Cl.
CPC ...... *G06F 12/1045* (2013.01); *G06F 12/0895* (2013.01); *G06F 12/0897* (2013.01); *G06F 12/126* (2013.01); *G06F 2212/6022* (2013.01)

(58) Field of Classification Search
None
See application file for complete search history.

(56) References Cited

U.S. PATENT DOCUMENTS

| 5,247,648 A | 9/1993 | Watkins et al. |
| 5,737,750 A | 4/1998 | Kumar et al. |

(Continued)

OTHER PUBLICATIONS

International Search Report and Written Opinion, International Patent No. PCT/US2013/032474, mailed Dec. 11, 2013, 9 pages.

*Primary Examiner* — David X Yi
*Assistant Examiner* — Craig Goldschmidt
(74) *Attorney, Agent, or Firm* — Trop, Pruner & Hu, P.C.

(57) ABSTRACT

A method to request memory from a far memory cache and implement, at an operating system (OS) level, a fully associative cache on the requested memory. The method includes pinning the working set of a program into the requested memory (pin buffer) so that it is not evicted due to cache conflicts and is served from the fast cache and not the slower next level memory. The requested memory extends the physical address space and is visible to and managed by the OS. The OS has the ability to make the requested memory visible to the user programs. The OS has the ability to manage the requested memory from the far memory cache as both a fully associative cache and a set associative cache.

24 Claims, 11 Drawing Sheets

(56) References Cited

U.S. PATENT DOCUMENTS

| | | | |
|---|---|---|---|
| 5,812,817 A | 9/1998 | Hovis et al. |
| 5,875,464 A | 2/1999 | Kirk |
| 6,044,438 A | 3/2000 | Olnowich |
| 6,092,155 A | 7/2000 | Olnowich |
| 6,122,659 A | 9/2000 | Olnowich |
| 6,122,674 A | 9/2000 | Olnowich |
| 6,122,711 A | 9/2000 | Mackenthun et al. |
| 6,343,346 B1 | 1/2002 | Olnowich |
| 6,421,761 B1 | 7/2002 | Arimilli et al. |
| 6,449,699 B2 | 9/2002 | Franke et al. |
| 6,542,926 B2 | 4/2003 | Zalewski et al. |
| 6,816,946 B2 | 11/2004 | Magoshi |
| 6,823,429 B1 | 11/2004 | Olnowich |
| 6,868,482 B1 | 3/2005 | Mackenthun et al. |
| 7,039,763 B2 | 5/2006 | O'Connor et al. |
| 7,050,063 B1 | 5/2006 | Mantor et al. |
| 7,240,156 B2 | 7/2007 | Hoshino et al. |
| 7,246,208 B2 | 7/2007 | Hoshino et al. |
| 7,353,337 B2 | 4/2008 | Wester et al. |
| 7,502,901 B2 | 3/2009 | Koga et al. |
| 7,558,920 B2 | 7/2009 | Mattina et al. |
| 7,739,454 B2 | 6/2010 | Hoshino et al. |
| 7,877,551 B2 | 1/2011 | Blumrich et al. |
| 7,895,151 B2 | 2/2011 | Shau et al. |
| 7,898,551 B2 | 3/2011 | Xu et al. |
| 8,165,988 B2 | 4/2012 | Shau et al. |
| 8,386,714 B2 | 2/2013 | Belluomini et al. |
| 2001/0052054 A1 | 12/2001 | Franke et al. |
| 2002/0052914 A1 | 5/2002 | Zalewski et al. |
| 2002/0116578 A1* | 8/2002 | Sakai ................ G06F 12/0862 711/118 |
| 2003/0101319 A1 | 5/2003 | Brutman et al. |
| 2004/0003178 A1 | 1/2004 | Magoshi |
| 2004/0193806 A1 | 9/2004 | Koga et al. |
| 2004/0205295 A1 | 10/2004 | O'Connor et al. |
| 2004/0246502 A1 | 12/2004 | Jacobsen et al. |
| 2005/0102465 A1* | 5/2005 | Royer ................ G06F 12/126 711/1 |
| 2005/0177684 A1 | 8/2005 | Hoshino et al. |
| 2006/0004963 A1 | 1/2006 | Mattina et al. |
| 2006/0112225 A1 | 5/2006 | Hoshino et al. |
| 2006/0164429 A1 | 7/2006 | Mantor et al. |
| 2006/0179225 A1 | 8/2006 | Wester et al. |
| 2007/0245085 A1 | 10/2007 | Hoshino et al. |
| 2008/0079744 A1 | 4/2008 | Xu et al. |
| 2008/0104329 A1* | 5/2008 | Gaither ............... G06F 12/0888 711/138 |
| 2008/0282055 A1 | 11/2008 | Yang et al. |
| 2009/0006769 A1 | 1/2009 | Blumrich et al. |
| 2009/0217280 A1 | 8/2009 | Miller et al. |
| 2009/0249015 A1 | 10/2009 | Tzeng |
| 2009/0271562 A1 | 10/2009 | Sinclair |
| 2009/0300293 A1 | 12/2009 | Mantor et al. |
| 2009/0313437 A1 | 12/2009 | Sofman et al. |
| 2009/0319550 A1 | 12/2009 | Shau et al. |
| 2010/0094948 A1* | 4/2010 | Ganesh ................ G06F 9/4856 709/212 |
| 2011/0099155 A1 | 4/2011 | Shau et al. |
| 2011/0099332 A1 | 4/2011 | Sofman et al. |
| 2011/0320687 A1 | 12/2011 | Belluomini et al. |
| 2012/0054442 A1 | 3/2012 | Walker |
| 2012/0166891 A1 | 6/2012 | Dahlen et al. |
| 2012/0215965 A1 | 8/2012 | Inada et al. |
| 2013/0007406 A1* | 1/2013 | Sheaffer ................ G06F 12/126 711/207 |
| 2013/0016109 A1* | 1/2013 | Garanzha ................ G06T 15/06 345/501 |
| 2013/0031327 A1 | 1/2013 | Chang et al. |

* cited by examiner

METHOD FOR PINNING DATA IN LARGE CACHE IN MULTI-LEVEL MEMORY SYSTEM

TECHNICAL FIELD

Embodiments described herein generally relate to memory management, and in particular, a method for managing memory in a multi-level memory system.

BACKGROUND

In a microprocessor employing a load-store register architecture, a significant percentage of the instructions in almost any code sequence are memory access instructions, in which data must be read from or written to a main memory address indicated by the instructions. Because main memory accesses, whether involving a read or a write, are slow relative to instruction execution, cache memories are utilized to reduce memory access latency. Often, a cache memory architecture includes multiple tiers of cache memories where each tier is relatively larger, but also relatively slower, than the preceding tier.

DESCRIPTION OF EMBODIMENTS

Figure 1A:
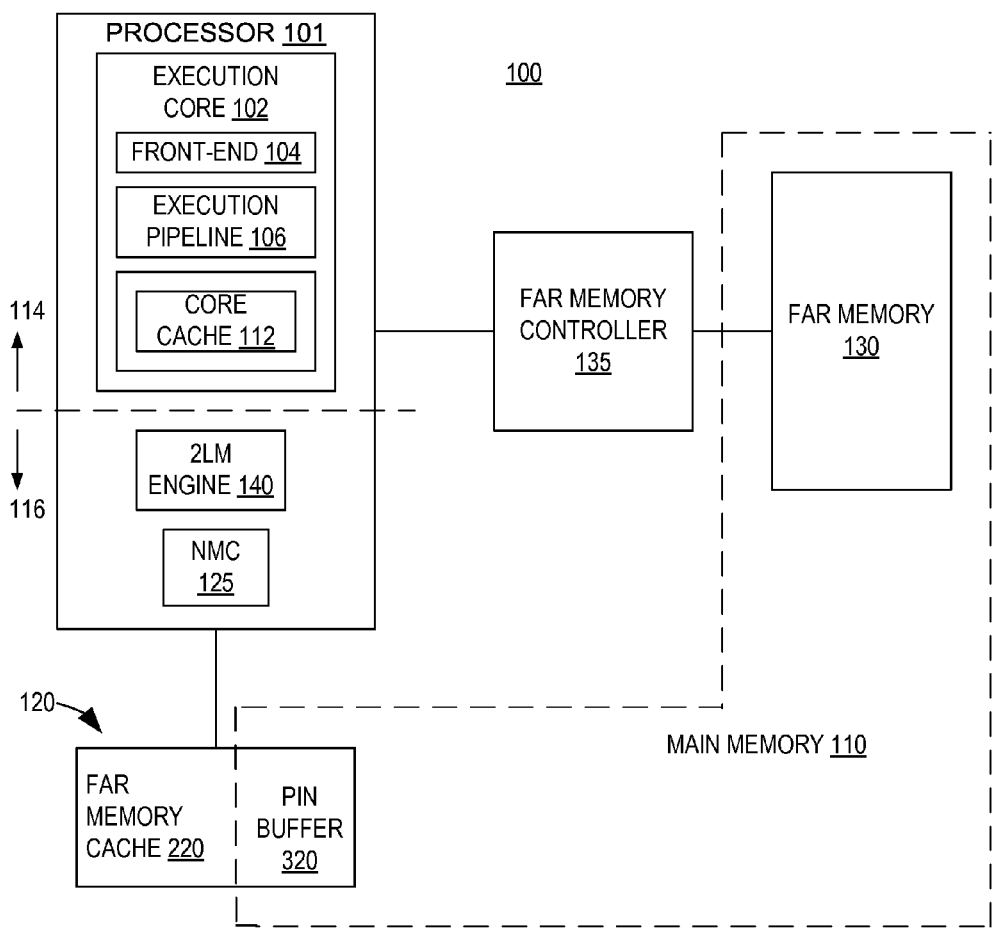
FIG. 1A illustrates an embodiment of a two-level memory system used in conjunction with at least one embodiment.

In at least one embodiment, a disclosed method to request memory from a far memory cache includes implementing, at an operating system (OS) level, a fully associative cache. In at least one embodiment, performing a memory configuration operation includes allocating a first portion of a near memory to a pin buffer and a second portion of the near memory to a far memory cache. In at least one embodiment, a system memory space is expanded to include the pin buffer in response to a memory configuration operation, and an entry of a page table, associated with a virtual address, is modified to map the virtual address to the pin buffer. In at least one embodiment, the memory configuration operation for a far memory cache may be implemented by special control registers in hardware or microcode.

In at least one embodiment, a disclosed method to manage the pin buffer includes pinning data to the pin buffer and unpinning the data from the pin buffer. Pinning data to the pin buffer may, in at least one embodiment, include copying data associated with a virtual address that maps to a region of the system memory space associated with the far memory into the pin buffer by modifying an entry of a page table associated with the virtual address to map the virtual address to the pin buffer in response to a pin request indicative of the virtual address. In at least one embodiment, after performing the pinning of the data, subsequent references to the pinned page are served from the pin buffer. Unpinning data that was previously pinned to the pin buffer may be accomplished by saving the data stored in the pinner buffer to a temporary storage location and then restoring the page table mapping associated with the virtual memory address to map the virtual memory address back to the original system memory space region. The data may then be transferred from the temporary storage location to the system memory address region to complete the unpinning process.

In at least one embodiment, a disclosed processor includes an execution core, a near memory controller to communicate with a near memory and a far memory interface to communicate with a far memory controller coupled to a far memory. In at least one embodiment, the processor includes resources (e.g., configuration registers) to signal the near memory controller to allocate a first portion of the near memory to a far memory cache and a second portion of the near memory to a pin buffer. In at least one embodiment, the near memory configuration operation signals the near memory controller to expand the system memory space to include, in addition to the far memory, the pin buffer, and to modify an entry of a page table associated with a virtual address to map the virtual address to the pin buffer.

In at least one embodiment, a first portion of near memory is a set associative cache and allocating the pin buffer, during a memory configuration operation, includes allocating the pin buffer to a portion of the sets. In at least one embodiment, the near memory is an n-way set associative cache wherein allocating the pin buffer includes allocating for each way in sets that are allocated to the pin buffer. In at least one embodiment, the near memory controller is operable to pin a portion of far memory to the pin buffer so that the applicable far memory address is mapped to the corresponding address in the pin buffer, responsive to determining that the pin buffer portion is currently unused.

In at least one embodiment, the near memory controller tracks memory configuration information including a pin buffer base physical address, a pin buffer end physical address, a near memory pin buffer base address, and a near memory pin buffer end address. In at least one embodiment, modifying a page table entry during a memory configuration operation includes determining a near memory address by determining an address offset from the virtual address and adding the offset address to the near memory pin buffer base address. Determining the address in near memory is performed, in at least one embodiment, by the near memory controller when accessing the near memory. In at least one embodiment, a contiguous region of the physical address space is allocated to the pin buffer, a contiguous address space of the near memory is allocated to the pin buffer, and a byte-to-byte mapping of physical address to near memory address is employed. In some of the embodiments, the pin buffer may be allocated in stripes or other non-contiguous patterns of the physical address space, the near memory, or both.

In at least one embodiment, the near memory includes a near memory tag array that is indexed during accesses to the first portion of the near memory and bypassed during accesses to the pin buffer. In at least one embodiment, the tag array is bypassed during pin buffer access because the page table provides a direct translation mapping to the applicable near memory address. In these embodiment(s), the pin buffer functions as a fully associative cache that is forcibly maintained or "pinned" to the previously allocated pin buffer portion of the near memory.

In at least one embodiment, far memory may be a byte-addressable, random access, persistent storage technology such as a solid state drive having a capacity that exceeds the capacity of near memory by at least an order of magnitude and the near memory is a random access, volatile storage technology, e.g., a dynamic random access memory (DRAM). In at least one other embodiment, however, the near memory is a persistent storage technology, the far memory is a volatile storage technology, or both.

In at least one embodiment, a disclosed system includes a processor and a multiple-tier main memory architecture that includes a far memory and a near memory. In at least one embodiment, the far memory may have a far memory capacity, a far memory latency, and a far memory storage technology while the near memory may have a near memory capacity, a near memory latency, and a near memory storage technology where the far memory capacity exceeds the near memory capacity and the far memory latency exceeds the near memory latency.

In at least one embodiment, the system includes a near memory controller to allocate a first portion of the near memory as a far memory cache and to allocate a second portion of the near memory as a pin buffer that supplements a main memory address space.

In at least one embodiment, the processor includes a core cache and a capacity of the near memory exceeds a capacity of the core cache by at least an order of magnitude and a capacity of the far memory exceeds the capacity of the near memory by at least an order of magnitude. In at least one embodiment, the far memory cache portion of the near memory is a set associative cache including a cache tag array while the pin buffer portion of the near memory can function as a tagless, fully associative cache that is mapped directly to virtual addresses by a page table. In at least one embodiment, the pin buffer can also function as a flat, unarranged extension of the physical address space (e.g., after memory configuration operation but before any pinning of data) that can be managed by the operating system. In at least one embodiment, the page table maps virtual addresses within a pin buffer portion of a physical address space to a pin buffer portion of the near memory space.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

System memory or main memory generally refers to physical and addressable memory that is recognized by an operating system. A cache memory generally has less capacity and a lower access time than system memory and is not generally thought of as being visible to the operating system. When an application program declares a variable, the operating system generally does not allocate a specific portion of cache memory to the variable. Instead, microprocessor hardware and microcode maintain copies of recently accessed main memory addresses and their neighboring addresses to take advantage of temporal locality, the observation that a memory address that was recently accessed is likely to be accessed soon in the future, and spatial locality, the observation that a memory address in close proximity to a recently accessed memory address is also likely to be accessed soon in the future. A cache memory is beneficial to the extent that, over a confined interval of time, the percentage of memory accesses that are cached, coupled with the performance benefit attributable to the lower latency of a cached memory access, justifies the cost and complexity of maintaining the cache memory itself.

Memory architecture designs are influenced by the available storage technologies. DRAM technology has been used extensively for main memory because it is a relatively dense and inexpensive technology, although relatively slow. Static random access memories (SRAMs), on the other hand, have been used extensively for cache memories because of their relative speed, despite being more expensive on a per bit basis, than DRAMs. Moreover, both DRAMs and SRAMs are volatile storage technologies, in the sense that stored data persists only so long as power is applied to the storage cell. To implement systems that can power down from time to time, a source of persistent storage is necessary. Historically, magnetic storage in the form of hard disk drives has provided the bulk of persistent memory for microprocessor based computers.

Thus, in many traditional systems, program instructions and data structures associated with an operating system or application program are stored persistently in a magnetic storage, and copied to a known page into DRAM main memory when the system is powered on and the operating system or application is executing. When specific individual instructions and data locations are accessed during execution, they may be cached in one or more SRAM cache memories. More recently, alternative storage architectures for allocating dynamic and persistent storage have devolved in conjunction with the development of relatively inexpensive and dense non-volatile memory technologies including solid state drives. A memory architecture referred to herein as a two level memory (2LM) architecture is described below.

FIG. 1A illustrates an embodiment of a two-level memory system used in conjunction with at least one embodiment employing a 2LM storage architecture. In at least one embodiment, system 100 includes a processor 101 and a main memory 110 that includes a far memory 130 and a portion of near memory 120.

In some embodiments, processor 101 includes a core region 114 and an uncore region 116. In at least one embodiment, core region 114 includes an execution core 102. In some embodiments, execution core 102 includes a front-end 104, an execution pipeline 106, and a core cache 112. In some embodiments, front-end 104 may be responsible for pre-fetching instructions, perhaps in conjunction with an instruction pointer (not depicted), decoding instructions, and pre-fetching of data corresponding to instruction operands that are available. In at least one embodiment, execution pipeline 106 may be responsible for scheduling instructions for execution, executing instructions in one or more execution ports (not shown in FIG. 1A) and retiring the results of the instructions. For memory access instructions, instruction execution may include accessing a data cache referred to in FIG. 1A as core cache 112. While in some embodiments processor 101 includes just one execution core 102, processor 101 may include multiple execution cores 102.

In at least one embodiment, as suggested by its name, uncore region 116 of processor 101 refers generally to elements of processor 101 not directly associated with the execution core 102 of processor 101. In some embodiments, uncore region 116 encompasses elements of processor 101 that may interface execution core 102 with system memory, input/output (I/O) devices, and so forth. In some embodiments, uncore 116 may communicate with chipset devices (not depicted) that provide interfaces for various types of I/O devices. Although in some embodiments, the functionality depicted may be illustrated as being implemented in uncore region 116 of processor 101, other embodiments may delegate analogous functionality to a chipset device. Similarly, while in some embodiments, uncore region 116 may suggest that some functionality is located in a chipset device, other embodiments may incorporate analogous functionality into uncore region 116.

In at least one embodiment, uncore region 116 includes resources to implement a 2LM architecture implementation of main memory 110. In some embodiments, main memory 110 includes a portion of near memory 120 and a far memory 130. In some embodiments, near memory 120 is smaller in capacity than far memory 130, but has less access latency than far memory 130 from the perspective of processor 101. Moreover, in some embodiments, near memory 120 is or includes volatile memory while far memory 130 is or includes persistent memory. In some embodiments, the volatile memory of near memory 120 may include DRAM while the persistent memory of far memory 130 may include a solid state drive, a phase-change memory device, or another suitable persistent storage technology.

In some embodiments, a ratio of the capacity of far memory 130 to the capacity of near memory 120 may vary based on the intended system use, but may, in some embodiments, exceed a factor of 10 or more. Moreover, because far memory 130 may be comprised of persistent storage that is relatively inexpensive, the total capacity of main memory 110 in some embodiments can be cost effectively increased independent of the capacity of near memory 120.

In at least one embodiment, processor 101 includes a 2LM engine 140 in uncore region 116 that coordinates the two major components of main memory 110, namely, near memory 120 and far memory 130. In some embodiments, 2LM engine 140 communicates with a near memory controller (NMC) 125 that provides memory control functions for near memory 120. In at least one embodiment, 2LM engine 140 also communicates with a far memory controller (FMC) 135 that provides memory control functions for far memory 130. In some embodiments, 2LM engine 140 beneficially maintains near memory 120 as a combination of a conventional cache memory and a specially allocated portion, referred to herein as a pin buffer, 320 that comprises a portion of the addressable memory space visible to the operating system. In these embodiments, a majority of the system memory space visible to the operating system is represented by far memory 130 while a small portion of the system memory includes a portion of near memory 120. In some embodiments, a remaining portion of near memory 120 functions as a far memory cache 220 that is not visible to the operating system, but stores copies of portions of far memory 130 to improve performance and decrease memory access latency.

To support functionality for pinning data in near memory 120, in some embodiments, system 100 supports an instruction, memory configuration operation, message, or application programming interface (API) function issued by the operating system or an application program requesting that a portion of main memory 110 be expanded by reserving space for pin buffer 320 in a portion of near memory 120. In at least one embodiment, processor 101 may include functionality to manage pin buffer 320 as a fully associative cache memory. Some embodiments of near memory 120, processor 101, NMC 125, and/or 2LM engine 140 implement resources that may be used to partition near memory 120 into two parts, each part behaving in a different manner. In some embodiments, near memory 120 is initialized as a set associative cache memory for far memory 130. In some embodiments, after a pin buffer request is received, near memory 120 may be partitioned into a cache memory portion, which continues to behave substantially as it did previously, but with fewer cache line entries available for caching data. In at least one embodiment, the other portion of near memory 120 may behave as a flat memory that extends the physical address space apparent to the operating system and, potentially, to application programs as well. In some embodiments, pin buffer 320 is implemented via a software level manager that manages requested space as a fully associative cache. In at least one embodiment, the near memory management may also extend a paging subsystem of the operating system to map virtual addresses directly to the pin buffer 320 portion of the near memory 120, i.e., map virtual addresses directly to addresses within near memory 120. In some embodiments, 2LM engine 140 may implement the use of a tag table (not depicted) to arbitrate which data segments will be included in near memory 120 and which data segment will be fetched from far memory 130. It is therefore understood that, because near memory 120 acts as a cache of far memory 130, the 2LM engine 140 may, in some embodiments, execute data pre-fetching or similar cache processes known in the art.

Figure 1B:
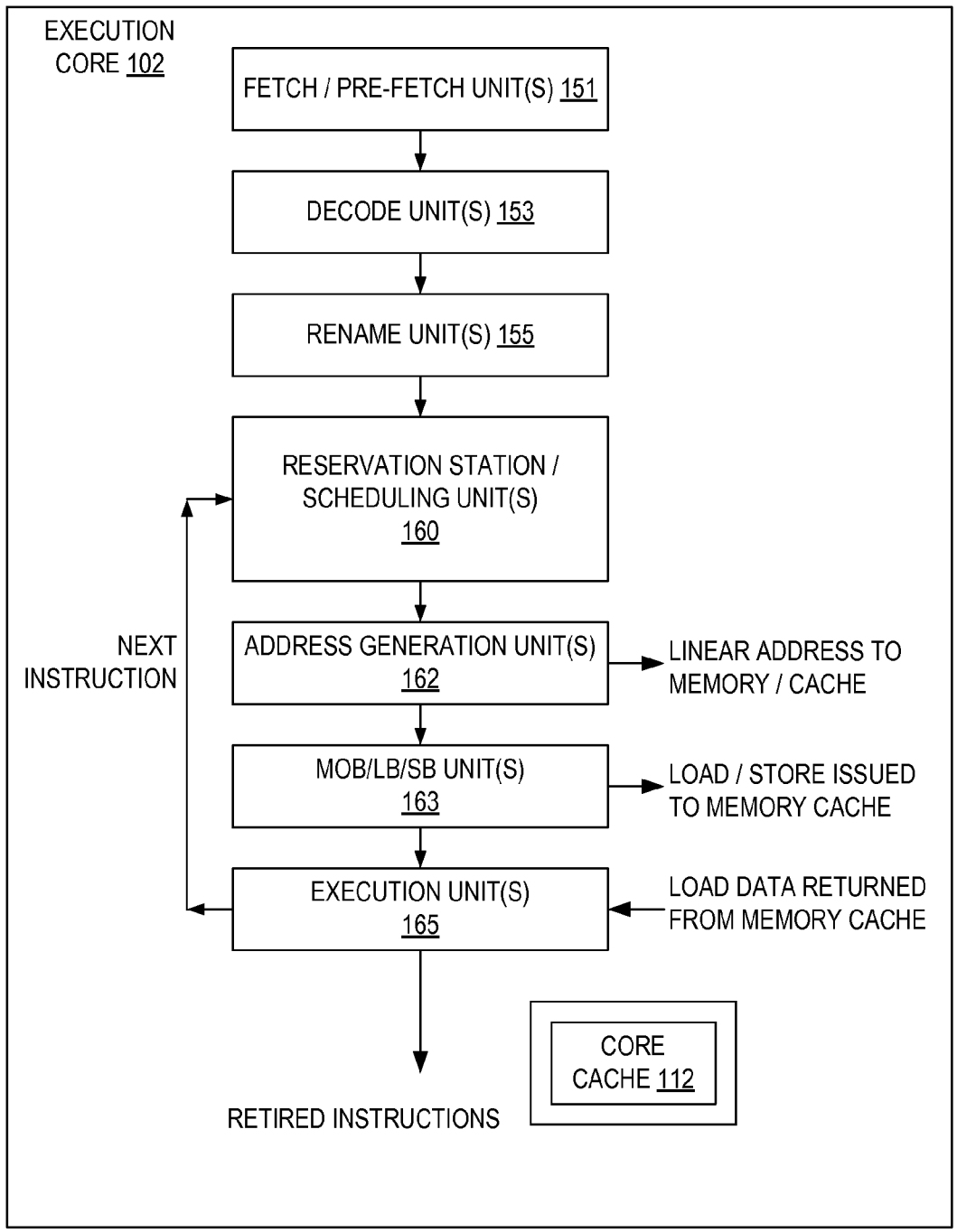
FIG. 1B illustrates an embodiment of a two-level memory system used in conjunction with at least one embodiment.

FIG. 1B illustrates an out-of-order execution core 102 that is an alternative architecture to the execution core illustrated in FIG. 1A. In at least one embodiment, pending loads may be speculatively issued to a memory address before other older pending store operations according to a prediction algorithm, such as a hashing function. In at least one embodiment, execution core 105 includes a fetch/prefetch unit 151, a decoder unit 153, one or more rename units 155 to assign registers to appropriate instructions or micro-ops, and one or more scheduling/reservation station units 160 to store micro-ops corresponding to load and store operations (e.g., STA micro-ops) until their corresponding target addresses source operands are determined. In some embodiments an address generation unit 162 to generate the target linear addresses corresponding to the load and stores, and an execution unit 165 to generate a pointer to the next operation to be dispatched from the scheduler/reservation stations 160 based on load data returned by dispatching load operations to memory/cache are also included. In at least one embodiment, a memory order buffer (MOB) 163, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores.

Figure 2:
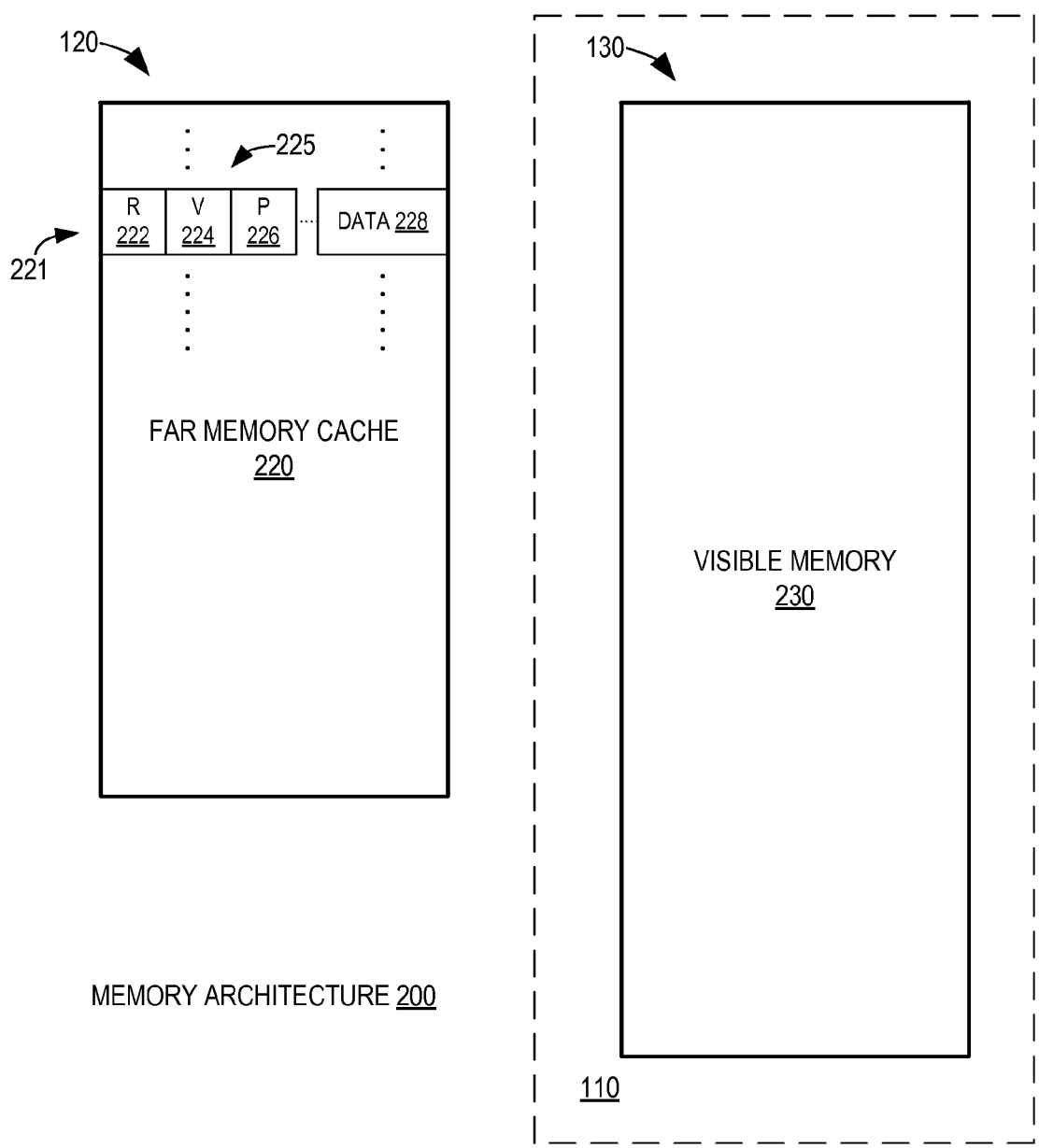
FIG. 2 illustrates an embodiment of a memory system before allocating a pin buffer in near memory used in conjunction with at least one embodiment.
Figure 3:
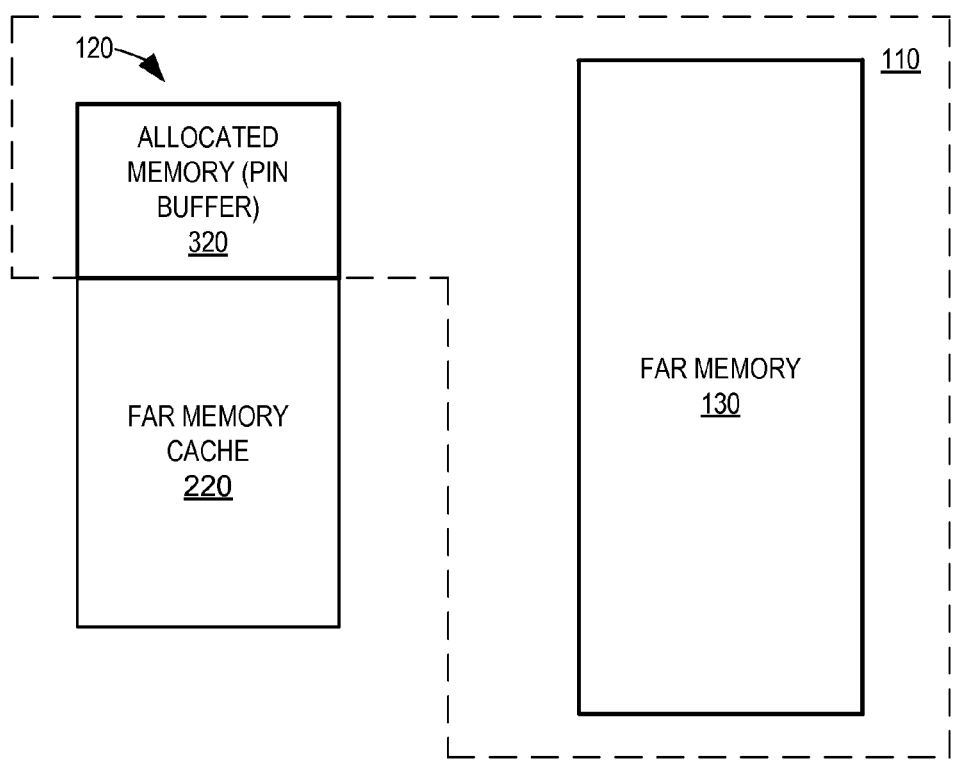
FIG. 3 illustrates an embodiment of a memory system after requesting memory for a pin buffer in near memory used in conjunction with at least one embodiment.

FIG. 2 and FIG. 3 illustrate different implementations of main memory 110 to illustrate different uses of near memory 120 that may be employed. In at least one embodiment, memory architecture 200 includes main memory 110 which is co-extensive with far memory 130 and for which no portion of near memory 120 is included within main memory 110. Instead, in some embodiments, the entirety of near memory 120 functions as a cache memory for far memory 130. The portion of near memory 120 that functions as a cache memory for far memory 130 is, in one embodiment, identified in FIG. 2 as far memory cache 220. In some embodiments, the portion of near memory 120 that functions as far memory cache 220 is typically organized as a set associative, multi-way cache that is entirely managed by hardware logic and is transparent or invisible to the OS or any user level applications. In contrast, in some embodiments, the physical address space of far memory 130 is visible to the OS as visible memory 230 and is managed by the OS. In at least one embodiment, near memory 120 is co-extensive with far memory cache 220. In at least one embodiment, main memory 110 (as shown) is illustrated before the operating system or an application program reserves a space in near memory 120 for a pin buffer and extends the main memory space with the reserved spaced for the pin buffer.

In at least one embodiment, far memory cache 220 includes a plurality of cache line entries 221. In some embodiments, cache line entries 221 include status information 225 and data 228. In some embodiments, status information 225 includes a replaced (R) indicator 222, a validity (V) indicator 224 and a pinned (P) indicator 226. In at least one embodiment, validity indicator 224 may indicate whether the corresponding cache line data 228 is valid, i.e., coherent with main memory 110. Pinned indicator 226 may, in some embodiments, indicate if the corresponding line is pinned in a specifically allocated portion of system 100, while a replaced indicator 222 indicates whether the line may be eligible to be replaced. In addition, in at least one embodiment, status information 225 may include additional or information other than is illustrated.

FIG. 3 illustrates an embodiment of a memory system after requesting memory for a pin buffer in near memory used in conjunction with at least one embodiment. In at least one embodiment, after the pin buffer is reserved, main memory 110 includes far memory 130 and a portion of near memory 120 identified in FIG. 3 as allocated memory (pin buffer) 320. In at least one embodiment, a remaining portion of near memory 120 is maintained as a conventional cache memory for far memory 130. In some embodiments, the physical address space of far memory 130 is visible to the OS and is managed by the OS.

In at least one embodiment, near memory 120 is divided into two contiguous parts, namely, a far memory cache 220, functionally equivalent to the far memory cache 220 illustrated in FIG. 2 although of smaller size, and a pin buffer 320. In some embodiments, pin buffer 320 represents a portion of near memory 120 that has been allocated. In some embodiments, far memory cache 220 is transparent to the OS or the user level applications and is managed by the hardware. In at least one embodiment, pin buffer 320 is visible to the OS and represents a flat extension of the main memory 110 address space.

Figure 4:
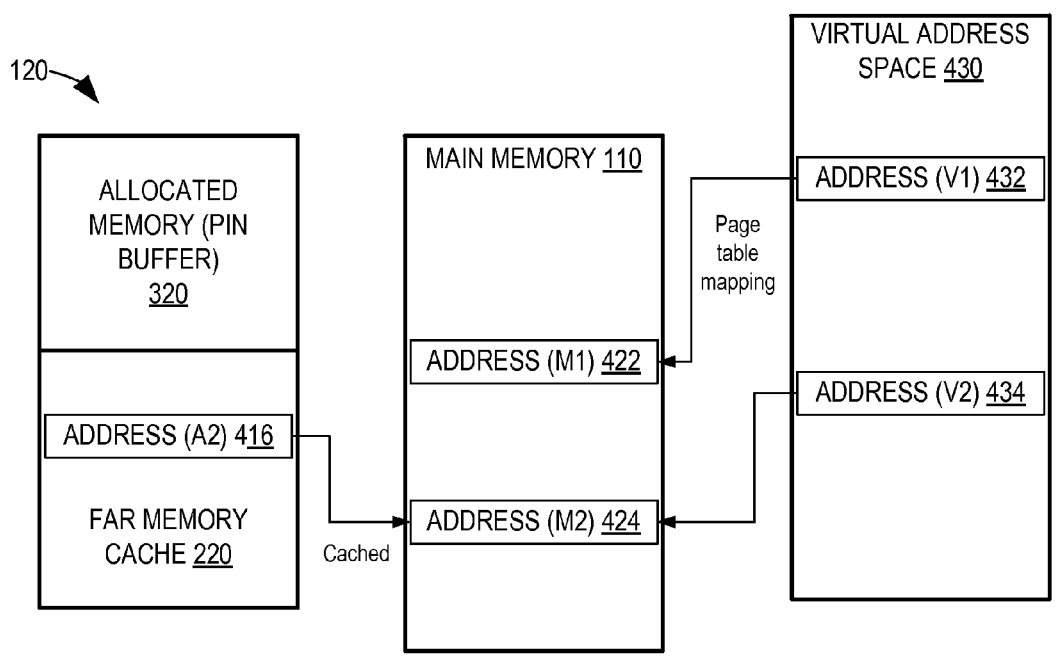
FIG. 4 illustrates an embodiment of a memory system before pinning addresses in the pin buffer used in conjunction with at least one embodiment.

FIG. 4 illustrates an embodiment of a memory system before pinning addresses in the pin buffer used in conjunction with at least one embodiment. In at least one embodiment, in a virtual address space 430, a first virtual address V1 432 is mapped in main memory 110 to a first main memory address M1 422 while a second virtual address V2 434 is mapped to a second main memory address M2 424. In addition, in some embodiments, the second main memory address M2 424 has (as shown) been cached in a portion of near memory 120. More specifically, in some embodiments, near memory 120 has been divided into a far memory cache 220 and a pin buffer 320, presumably through the execution of a request to reserve memory for a pin buffer, and second main memory address M2 424 has been cached in near memory address A2 416. Note that, because address A2 416 resides in far memory cache 220, the address is not visible to the OS, but is tracked by cache memory hardware in some embodiments.

Figure 5:
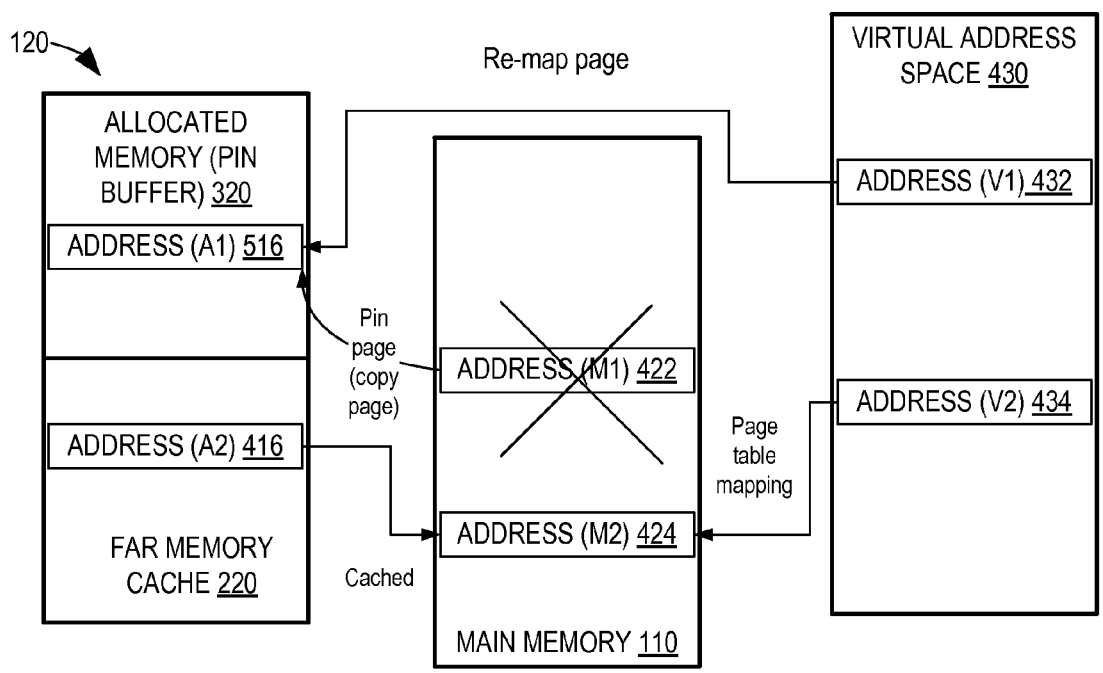
FIG. 5 illustrates an embodiment of a memory system after pinning addresses in the pin buffer used in conjunction with at least one embodiment.

FIG. 5 illustrates an embodiment of a memory system after pinning addresses in the pin buffer used in conjunction with at least one embodiment. FIG. 5 illustrates that the mapping of first virtual address V1 432 to main memory address M1 422, which was illustrated in FIG. 4, has been replaced with a mapping from first virtual address V1 432 to address A1 516 of near memory 120. In at least one embodiment, address A1 516 of near memory 120 is included in a portion of near memory 120 that was allocated as pin buffer 320. It should be noted that in some embodiments the address space for main memory 110 includes far memory 130 (not illustrated in FIG. 5) as well as the pin buffer 320 in near memory 120. Note also that, as illustrated in FIG. 5, far memory cache 220 of near memory 120 continues, in some embodiments, to cache main memory address M2 424. In some embodiments, an address which is pinned, i.e., resides in the pin buffer, cannot be cached by far memory cache 220. In at least one embodiment, A1 516 cannot be cached by far memory cache 220, due to the reason that two entries of the same data cannot reside in near memory 120.

In at least one embodiment, the OS may pin virtual address V1 432 in pin buffer 320 by copying an entire page or some other segment of memory space from far memory 130 to a segment of near memory 120 that is within pin buffer 320 and encompasses address A1 516. In some embodiments, after the mapping to main memory address M1 422 is removed, address M1 422 is freed up to store new data. In some embodiments, after pinning an entire page to pin buffer 320 is performed, all subsequent references to the pinned page are served directly from pin buffer 320. In at least one embodiment, the caching and page table mapping of address M2 424 from the main memory 110 from the split far memory cache 220 remains unchanged. These operations can be implemented entirely in software as part of the OS, in microcode or in hardware performed by the processor In order to "unpin" data from pin buffer 320, the OS may, in some embodiments, copy the applicable page from pin buffer 320 to far memory 130 and update the corresponding virtual-to-physical page table entries so that they represent the actual address mappings.

Figure 6:
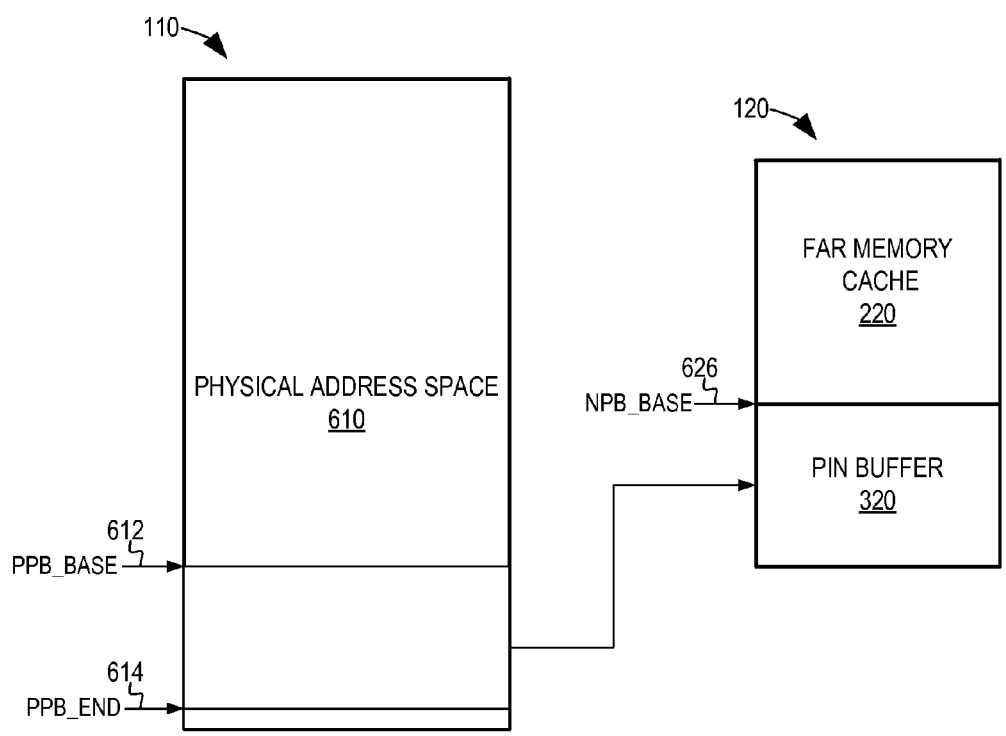
FIG. 6 illustrates an embodiment of functional address mapping used in conjunction with at least one embodiment.

FIG. 6 illustrates an embodiment of functional address mapping used in conjunction with at least one embodiment. As indicated previously, the allocated memory and the main memory form the physical address space. In at least one embodiment, to support a pin buffer 320 in near memory 120, the OS and the hardware may determine a contiguous region of physical address space 610 in main memory 110 that will represent the pin buffer addresses. In at least one embodiment, a pin buffer 320 in a near memory 120 is configured with the start and end markers (PPB_BASE 612, PPB_END 614) from physical address space 610. In at least one embodiment, NPB_BASE 626 that defines the beginning of pin buffer 320 in near memory 120 is included. In some embodiments, by mapping PPB_BASE 612 to NPB_BASE 626 and determining an offset from PPB_BASE 612 to the address of interest, an address from the physical space may be mapped to an address in pin buffer 320.

In some embodiments, it is to be understood that the addressing of the data array in near memory 120 is such that the reserved cache blocks are all consecutive. Therefore, in at least one embodiment, near memory 120 is configured with the start address of this consecutive region (NPB_BASE 626). During normal operation, an OS-assigned physical address obtained from conventional page tables may be used in all the upper level caches. In some embodiments, the near memory controller, on the other hand, first checks if an incoming memory operation's address (referred to as physical address PA) falls within the pin buffer address space (i.e., an address between PPB_BASE 612 and PPB_END 614). If so, in some embodiments, the address to the near memory data array is formed by adding the PA's offset relative to the start of the pin buffer address space. In at least one embodiment, pin buffer accesses do not incur tag lookup and are directly sent to the near memory data array. In some embodiments, while the addressing is consecutive, it is noteworthy that it is not necessary to have the reserved blocks laid out consecutively in the near memory data array. In some embodiments, the 2LM engine can determine the near memory location from the physical address assuming a simple functional one-to-one mapping is utilized.

Figure 7:
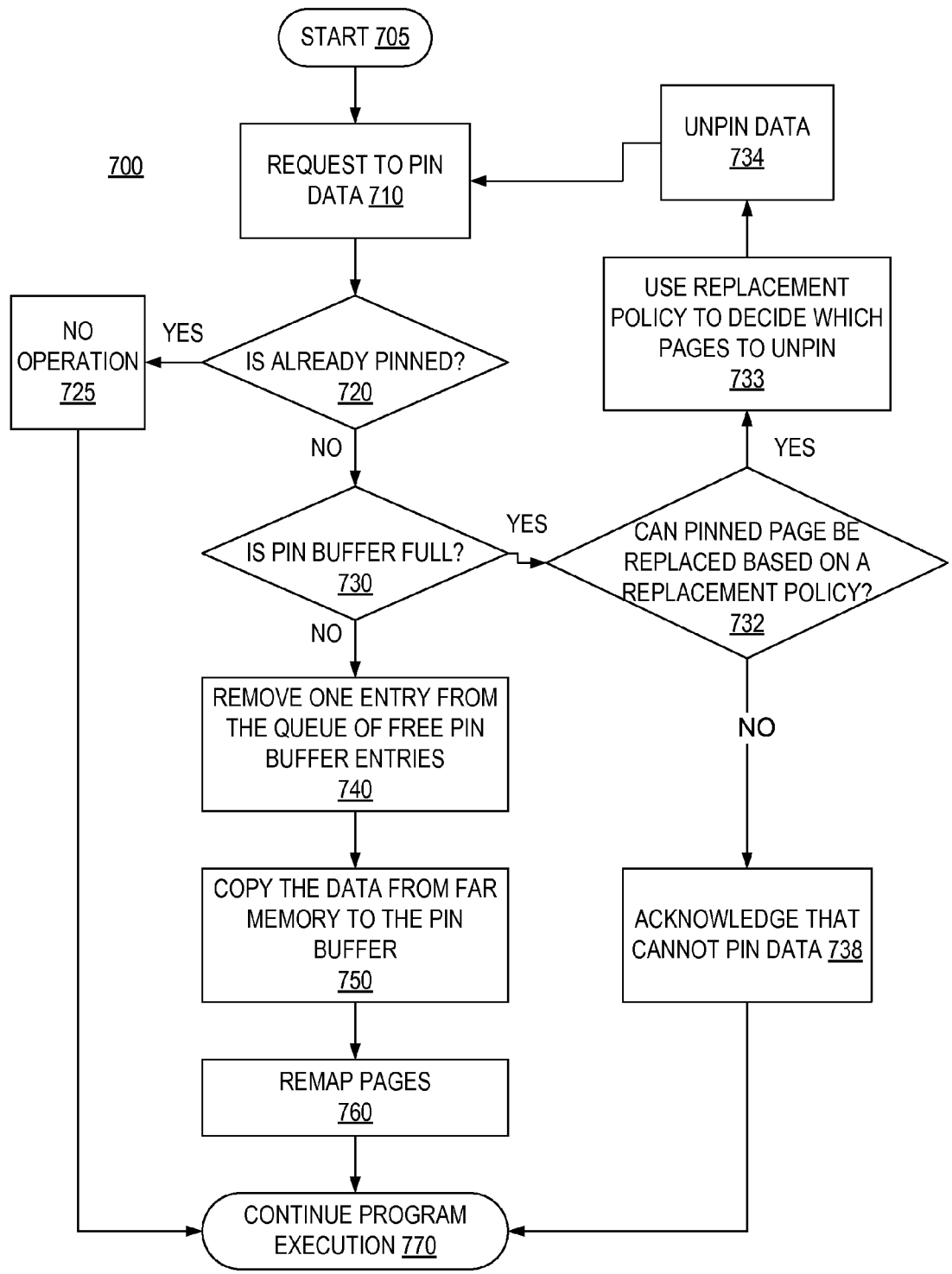
FIG. 7 illustrates one embodiment of a method for pinning data in a far memory cache in a multi-level memory system used in conjunction with at least one embodiment.

FIG. 7 illustrates one embodiment of a method for pinning data in a far memory cache in a multi-level memory system used in conjunction with at least one embodiment. Flow diagrams as illustrated here show sequences of various process actions. Although shown in a particular sequence or order, unless otherwise stated, the order of the actions can be modified.

In at least one embodiment, method 700 may begin, in operation 705, when an operating system issues (operation 710) a pin data request identifying a specific address or page of memory. In some embodiments, a determination is made (operation 720) whether the address indicated in the pin request is already pinned in the pin buffer. In at least one embodiment, if the address has already been pinned to the pin buffer, then no operation 725 is performed and the program execution (operation 770) continues. In some embodiments, if a determination is made, in operation 720, that the address indicated in the pin request is not pinned in the pin buffer then, in operation 730, the pin buffer is checked to see if it is full. In some embodiments, if it is determined that the pin buffer is not full, one entry from the queue of free pin buffer entries is removed in operation 740. In at least one embodiment, the entry is then copied from far memory into the pin buffer (operation 750) by the OS, or a microcode, and the corresponding virtual-to-physical address mappings are updated (operation 760) to reflect that the virtual address points to the new physical address where the data is copied and the old location is freed. After this change, all subsequent references to the pinned page are, in some embodiments, served directly from the pin buffer as if the data is cached in the far memory cache. In some embodiments, once the corresponding virtual-to-physical address mappings are updated in operation 760, the program execution continues (operation 770).

In at least one embodiment, if it is determined that the pin buffer is full in operation 730, then a determination needs to be made whether a pinned page can be implicitly replaced based on a replacement policy (operation 732). In some embodiments, if a pinned page cannot be replaced based on a replacement policy, acknowledgement is made that the data cannot be pinned (operation 738) and program execution continues in operation 770.

In some embodiments, if it is determined that the pinned page can be replaced based on a replacement policy in operation 732, the replacement policy is used to decide which pages to unpin (operation 733). In at least one embodiment, in operation 734, the data is unpinned and method 700 resumes to request to pin data in operation 710.

In some embodiments, because data is explicitly pinned in the pin buffer when requested, it is necessary for the OS to keep track of the available space in the pin buffer and implement a replacement policy. In at least one embodiment, a replacement policy utilized may be the implementation of a least recently used replacement, where the queue orders the entries from the most recently used to the least recently used page. In some embodiments, the OS maintains an additional data structure, such as a queue (FIFO) which contains the offsets of the empty slots in the pin buffer. In at least one embodiments, if the queue is empty, i.e., the pin buffer is full, the OS may either ignore the pin request or automatically replace already pinned data with the new data.

In some embodiments, when a program, which contains pinned data, terminates without unpinning its data, the pinned data is automatically unpinned by the OS by releasing the virtual-to-physical address mappings in the translation page table for the corresponding process which represents the program execution.

Figure 8:
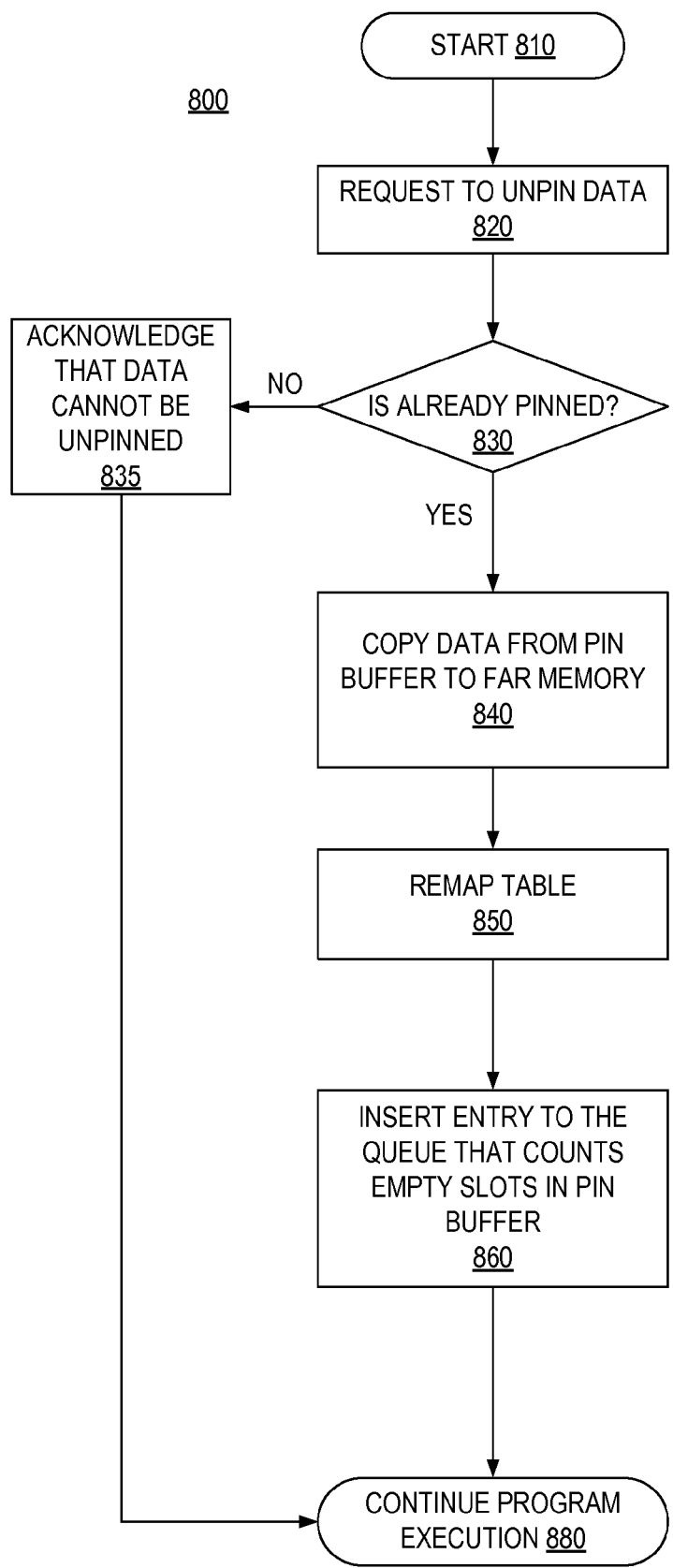
FIG. 8 illustrates one embodiment of a method for unpinning data in a far memory cache in a multi-level memory system used in conjunction with at least one embodiment.

FIG. 8 illustrates one embodiment of a method for unpinning data in a far memory cache in a multi-level memory system used in conjunction with at least one embodiment. In at least one embodiment, method 800 begins in operation 810 and continues on to request to unpin data in operation 820. In some embodiments, a determination is made in operation 830 whether the data is already pinned. In some embodiments, if a determination is made that the data is not already pinned, an acknowledgement is made that the data cannot be unpinned in operation 835, and program execution continues (operation 880).

In at least one embodiment, if it is determined that the data is already pinned in operation 830, the data from the pin buffer is unpinned and copied (operation 840) to main memory. In some embodiments, the translation table is remapped (operation 850) and an entry is then inserted into the queue of empty slots in the queue in operation 860. In at least one embodiment, once unpinning the data is accomplished, program execution continues (operation 880).

Figure 9:
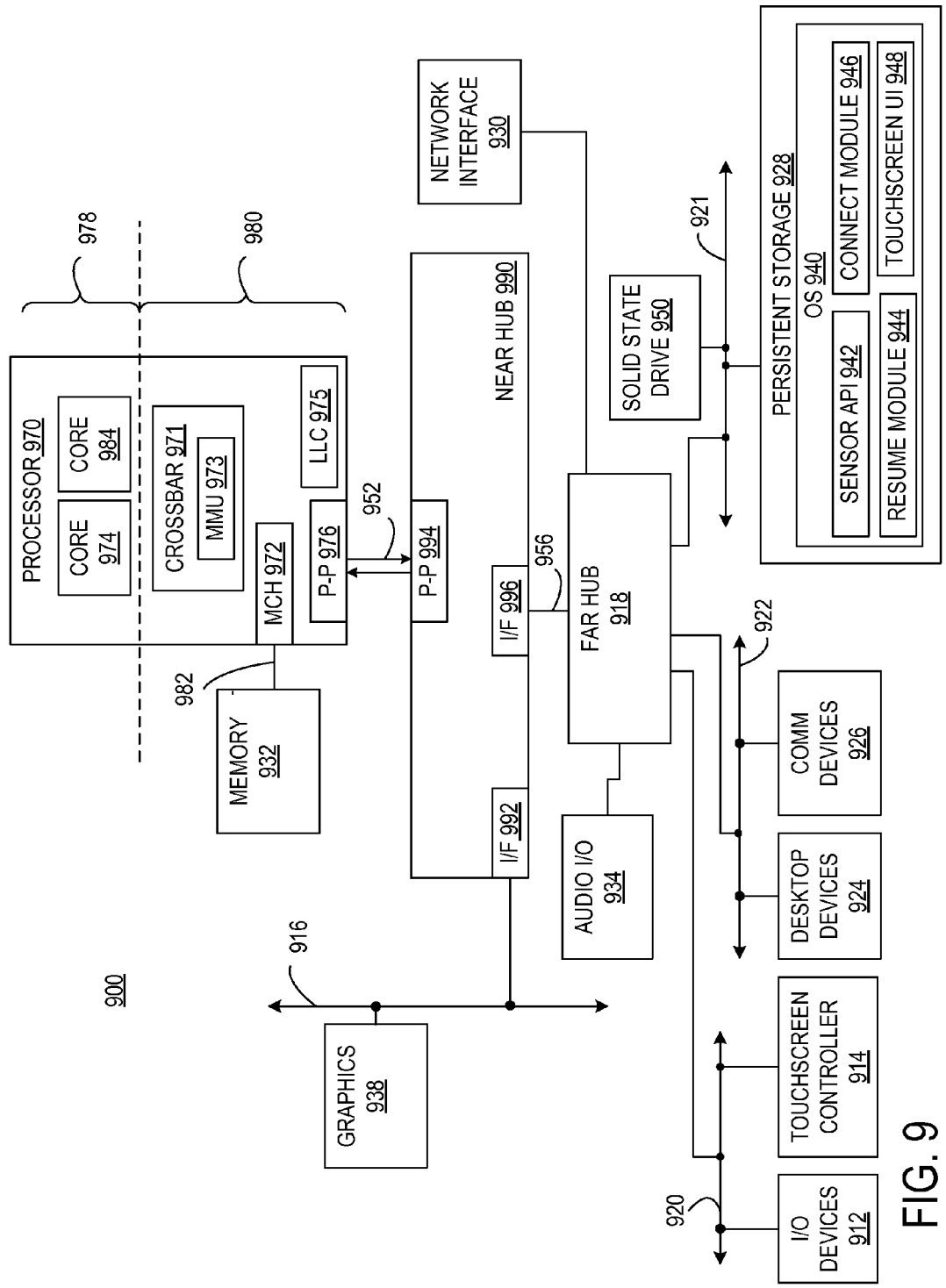
FIG. 9 illustrates elements of an embodiment of a processor system used in conjunction with at least one embodiment.

Embodiments may be implemented in many different system types and platforms. FIG. 9 illustrates elements of an embodiment of a processor system used in conjunction with at least one embodiment. In one embodiment, a processor, memory, and input/output devices are interconnected by a number of point-to-point (P-P) interfaces, as will be described in further detail. However, in other embodiments, the processor system may employ different bus architectures, such as a front side bus, a multi-drop bus, and/or another implementation. Although a processor is illustrated in FIG. 9 for descriptive clarity, in various embodiments, a different number of processors may be employed using elements of the illustrated architecture.

In at least one embodiment, processor system 900 is a point-to-point interconnect system, and includes processor 970. In some embodiments, processor 970 is a multi-core processor including first core 974 and second core 984. It is noted that other elements of processor 970 besides cores 974, 984 may be referred to as an uncore. In different embodiments, a varying number of cores may be present in a particular processor. In at least one embodiment, cores 974, 984 may comprise a number of sub-elements (not shown in FIG. 9), also referred to as clusters, that provide different aspects of overall functionality. In some embodiments, cores 974, 984 may each include a memory cluster (not shown in FIG. 9) that may comprise one or more levels of cache memory. In some embodiments, other clusters (not shown in FIG. 9) in cores 974, 984 may include a front-end cluster and an execution cluster.

In particular embodiments, first core 974 and second core 984 within processor 970 are not equipped with direct means of communicating with each other, but rather, communicate via crossbar 971, which may include intelligent functionality such as cache control, data queuing, P-P protocols, and multi-core interfacing. In some embodiments, crossbar 971 may thus represent an intelligent uncore controller that interconnects cores 974, 984 with memory controller hub (MCH) 972, last-level cache memory (LLC) 975, and P-P interface 976, among other elements. In particular, to improve performance in such an architecture, cache controller functionality within crossbar 971 may, in some embodiments, enable selective caching of data within a cache hierarchy including LLC 975 and one or more caches present in cores 974, 984. In at least one embodiment, crossbar 971 includes memory management unit (MMU) 973 that handles access to virtual memory addresses and maintains translation look aside buffers (not shown in FIG. 9) for improved performance with regard to memory access. In some embodiments, crossbar 971 is referred to as a global queue.

In at least one embodiment, LLC 975 may be coupled to a pair of processor cores 974, 984, respectively. In some embodiments, LLC 975 may be shared by core 974 and core 984. LLC 975 may, in some embodiments, be fully shared such that any single one of cores 974, 984 may fill or access the full storage capacity of LLC 975. Additionally, in at least one embodiment, MCH 972 may provide for direct access by processor 970 to memory 932 via memory interface 982. In at least one embodiment, memory 932 may be a double-data rate (DDR) type DRAM while memory interface 982 and MCH 972 comply with a DDR interface specification. In some embodiments, memory 932 may represent a bank of memory interfaces (or slots) that may be populated with corresponding memory circuits for a desired DRAM capacity.

In at least one embodiment, processor 970 may also communicate with other elements of processor system 900, such as near hub 990 and far hub 918, which are also collectively referred to as a chipset that supports processor 970. In some embodiments, P-P interface 976 may be used by processor 970 to communicate with near hub 990 via interconnect link 952. In certain embodiments, P-P interfaces 976, 994 and interconnect link 952 are implemented using Intel QuickPath Interconnect architecture.

In at least one embodiment, near hub 990 includes interface 992 to couple near hub 990 with first bus 916, which may support high-performance I/O with corresponding bus devices, such as graphics 938 and/or other bus devices. In particular embodiments, graphics 938 may represent a high-performance graphics engine that outputs to a display device (not shown in FIG. 9). In one embodiment, first bus 916 is a Peripheral Component Interconnect (PCI) bus, such as a PCI Express (PCIe) bus and/or another computer expansion bus. In some embodiments, near hub 990 may also be coupled to far hub 918 at interface 996 via interconnect link 956. In certain embodiments, interface 996 is referred to as a south bridge. In some embodiments, far hub 918 may provide I/O interconnections for various computer system peripheral devices and interfaces and may provide backward compatibility with legacy computer system peripheral devices and interfaces. Thus, in some embodiments, far hub 918 provides network interface 930 and audio I/O 934, as well as, provides interfaces to second bus 920, third bus 922, and fourth bus 921, as will be described in further detail.

In at least one embodiment, second bus 920 may support expanded functionality for processor system 900 with I/O devices 912, and may be a PCI-type computer bus. In some embodiments, third bus 922 may be a peripheral bus for end-user consumer devices, represented by desktop devices 924 and communication devices 926, which may include various types of keyboards, computer mice, communication devices, data storage devices, bus expansion devices, etc. In certain embodiments, third bus 922 represents a Universal Serial Bus (USB) or similar peripheral interconnect bus. In some embodiments, fourth bus 921 may represent a computer interface bus for connecting mass storage devices, such as hard disk drives, optical drives, and disk arrays, which are generically represented by persistent storage 928, shown including OS 940, that may be executable by processor 970.

In some embodiments, system 900 emphasizes a computer system that incorporates various features that facilitate handheld or tablet type of operation and other features that facilitate laptop or desktop operation. In addition, in particular embodiments, system 900 includes features that cooperate to aggressively conserve power while simultaneously reducing latency associated with traditional power conservation states.

In at least one embodiment, sensor API 942 provides application program access to one or more sensors (not depicted) that may be included in system 900. Sensors that system 900 might have in some embodiments include an accelerometer, a global positioning system (GPS) device, a gyro meter, an inclinometer, and a light sensor. In some embodiments, resume module 944 may be implemented as software that, when executed, performs operations for reducing latency when transitioning system 900 from a power conservation state to an operating state. In some embodiments, resume module 944 may work in conjunction with solid state drive (SSD) 950 to reduce the amount of SSD storage required when system 900 enters a power conservation mode. Resume module 944 may, in some embodiments, flush standby and temporary memory pages before transitioning to a sleep mode. In some embodiments, by reducing the amount of system memory space that system 900 is required to preserve upon entering a low power state, resume module 944 beneficially reduces the amount of time required to perform the transition from the low power state to an operating state. In at least one embodiment, connect module 946 may include software instructions that, when executed, perform complementary functions for conserving power while reducing the amount of latency or delay associated with traditional "wake up" sequences. In some embodiments, connect module 946 may periodically update certain "dynamic" applications including email and social network applications, so that, when system 900 wakes from a low power mode, the applications that are often most likely to require refreshing are up to date. In at least one embodiment, touchscreen user interface 948 supports a touchscreen controller 914 that enables user input via touchscreens traditionally reserved for handheld applications. In some embodiments, the inclusion of touchscreen support in conjunction with support for communication devices 926 enables system 900 to provide features traditionally found in dedicated tablet devices as well as features found in dedicated laptop and desktop type systems.

Figure 10:
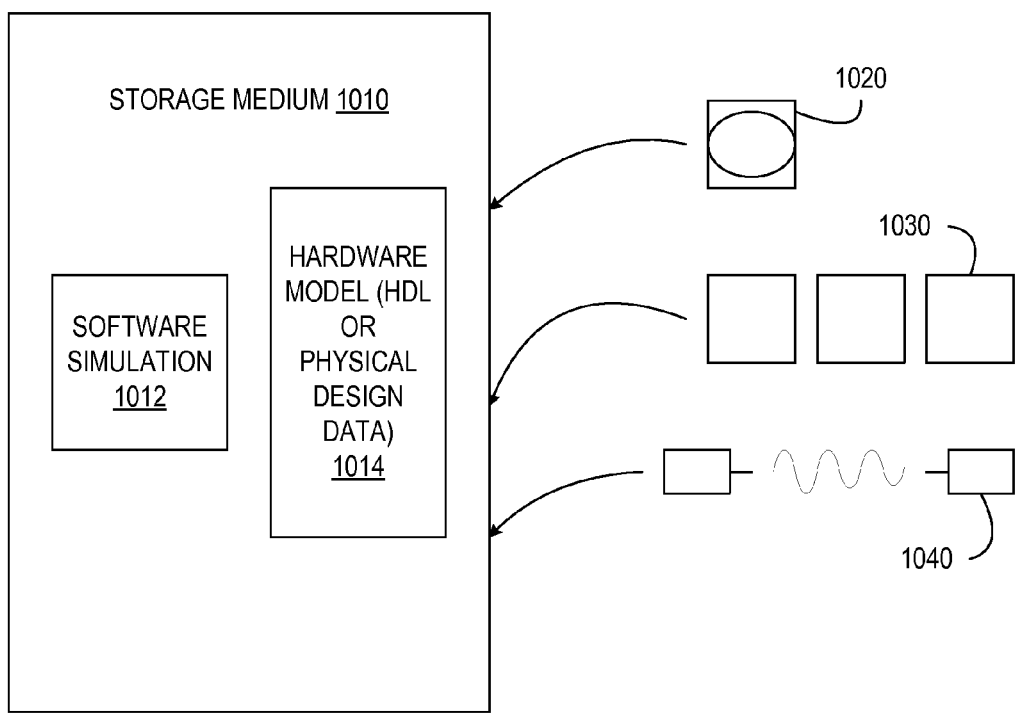
FIG. 10 illustrates a representation for simulation, emulation and fabrication of a design implementing the disclosed techniques used in conjunction with at least one embodiment.

FIG. 10 illustrates a representation for simulation, emulation and fabrication of a design implementing the disclosed techniques used in conjunction with at least one embodiment. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 1014 may be stored in a storage medium 1010 such as a computer memory so that the model may be simulated using simulation software 1012 that applies a particular test suite to the hardware model 1014 to determine if it indeed functions as intended. In some embodiments, the simulation software 1012 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 1040 modulated or otherwise generated to transmit such information, a memory 1030, or a magnetic or optical storage 1020 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments.

Embodiment 1 is a method for requesting memory comprising: (i) performing a memory configuration operation including: allocating a first (system) portion of a near memory to a pin buffer; allocating a second (cache) portion of the near memory to a cache for a far memory; and expanding a system memory space to include the pin buffer; and (ii) managing the pin buffer, wherein the managing includes: pinning data associated with a virtual address that maps to a portion of the system memory space associated with the far memory into the pin buffer by modifying an entry of a page table associated with the virtual address to map the virtual address to the pin buffer in response to a pin request indicating the virtual address; and unpinning data associated with the pin request from the pin buffer by modifying the entry to map the virtual address to a system memory address.

In embodiment 2, the second portion of near memory included in the subject matter of embodiment 1 can optionally include a set associative cache and the managing of the pin buffer included in the subject matter of embodiment 1 can optionally include allocating the pin buffer to a portion of sets.

In embodiment 3, the near memory included in the subject matter of embodiment 1 can optionally include an n-way, set associated cache and the managing of the pin buffer included in the subject matter of embodiment 1 can optionally include allocating all n-ways of each set that is allocated in the pin buffer to a first way of the near memory.

In embodiment 4, the modifying of the entry of the page table included in the subject matter of embodiment 1 can optionally include determining a near memory address by adding a physical address offset associated with the virtual address to a near memory pin buffer base address.

In embodiment 5, the near memory included in the subject matter of embodiment 1 can optionally include a near memory tag array, the near memory tag array included in the subject matter of embodiment 1 is optionally indexed during accesses to the second portion of the near memory, and the near memory tag array included in the subject matter of embodiment 1 is optionally bypassed during accesses to the pin buffer.

In embodiment 6, the subject matter of embodiment 1 can optionally include a near memory controller, wherein the near memory controller pins a portion of the pin buffer to cache a far memory address responsive to determining that the pin buffer portion is currently unused.

In embodiment 7, byte-addressable far memory included in the subject matter of embodiment 1 can optionally include persistent storage.

In embodiment 8, byte-addressable far memory included in the subject matter of embodiment 7 can optionally include random access storage.

In embodiment 9, a memory configuration operation included in the subject matter of embodiment 1 can optionally be implemented by resources including: special control registers and microcode.

Embodiment 10 is a computer system comprising: a near memory controller to communicate with a near memory; a far memory interface to communicate with a far memory controller coupled to a far memory; and an execution unit, including memory configuration operation resources to: signal the near memory controller to: allocate a pin buffer, wherein the allocating of the pin buffer includes allocating a first portion of the near memory to a pin buffer and a second portion of the near memory to a cache for a far memory; expand a system memory space to include the pin buffer, responsive to memory configuration operation; and modify an entry of a page table associated with a virtual address to map the virtual address to the pin buffer, responsive to a pin request.

In embodiment 11, the second portion of near memory included in the subject matter of embodiment 10 can optionally include a set associative cache and the allocating of the pin buffer included in the subject matter of embodiment 10 can optionally include allocating the pin buffer to a portion of sets.

In embodiment 12, the near memory included in the subject matter of embodiment 10 can optionally include an n-way, set associative cache and the allocating of the pin buffer included in the subject matter of embodiment 10 can optionally include allocating all n-ways of each set that is allocated in the pin buffer to a first way of the near memory.

In embodiment 13, modifying the entry of the page table included in the subject matter of embodiment 10 can optionally include determining a near memory address by adding a physical address offset associated with the virtual address to a near memory pin buffer base address.

In embodiment 14, the near memory included in the subject matter of embodiment 10 can optionally include a near memory tag array, the near memory tag array included in the subject matter of embodiment 10 is optionally indexed during accesses to the second portion of the near memory, and the near memory tag array included in the subject matter of embodiment 10 is optionally bypassed during accesses to the pin buffer.

In embodiment 15, the near memory controller included in the subject matter of embodiment 10 can optionally pin a portion of the pin buffer to cache a far memory address responsive to determining that the pin buffer portion is currently unused.

In embodiment 16, byte-addressable far memory included in the subject matter of embodiment 10 can optionally include persistent storage.

In embodiment 17, byte-addressable far memory included in the subject matter of embodiment 16 can optionally include random access storage.

Embodiment 18 is a system comprising: (i) first storage to store an operating system; (ii) a processor; (iii) a multiple tier main memory architecture including: a far memory having a far memory capacity, a far memory latency, and a far memory storage technology; and a near memory having a near memory capacity, a near memory latency, and a near memory storage technology; and (iv) a near memory controller to: allocate a first portion of the near memory as a far memory cache; and allocate, responsive to execution by the processor of a memory configuration operation, a second portion of the near memory as a pin buffer occupying a portion of a main memory address space.

In embodiment 19, the far memory storage technology included in the subject matter of embodiment 18 can optionally include a byte-addressable persistent storage technology.

In embodiment 20, the far memory storage technology included in the subject matter of embodiment 19 can optionally include a byte-addressable randomly accessible storage technology.

In embodiment 21, the near memory storage technology included in the subject matter of embodiment 20 can optionally include a volatile, random access storage technology.

In embodiment 22, the processor included in the subject matter of embodiment 18 can optionally include a core cache and wherein a capacity of the near memory exceeds a capacity of the core cache by at least an order of magnitude and wherein a capacity of the far memory exceeds the capacity of the near memory by at least an order of magnitude.

In embodiment 23, the far memory cache included in the subject matter of embodiment 18 can optionally include a set associative cache including a cache tag array and wherein the pin buffer functions as a tagless, fully associative cache.

In embodiment 24, the subject matter of embodiment 23 can optionally include a page table mapping virtual addresses to physical addresses, wherein the page table maps virtual addresses within a pin buffer portion of a physical address space to a pin buffer portion of the near memory.

In embodiment 25, the second portion of the near memory included in the subject matter of embodiment 18 can optionally include a set associative cache and the allocating of the pin buffer included in the subject matter of embodiment 18 can optionally include allocating the pin buffer to a portion of sets.

In embodiment 26, the near memory controller included in the subject matter of embodiment 25 is optionally operable to pin a reserved way of the pin buffer for the far memory cache responsive to determining that the reserved way is currently unused by the pin buffer.

In embodiment 27, a memory configuration operation included in the subject matter of any one of embodiments 1-7 can optionally be implemented by resources including: special control registers and microcode.

In embodiment 28, byte-addressable far memory included in the subject matter of any one of embodiments 10-16 can optionally include random access storage.

In embodiment 29, the far memory storage technology included in the subject matter of any one of embodiments 18 or 19 can optionally include a byte-addressable randomly accessible storage technology.

In embodiment 30, the processor included in the subject matter of any one of embodiments 18 or 19 can optionally include a core cache and wherein a capacity of the near memory exceeds a capacity of the core cache by at least an order of magnitude and wherein a capacity of the far memory exceeds the capacity of the near memory by at least an order of magnitude.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method comprising:
    performing a memory configuration operation including:
        allocating a first (system) portion of a near memory to a pin buffer;
        allocating a second (cache) portion of the near memory to a cache for a far memory; and
        expanding a system memory space to include the pin buffer; and
    managing the pin buffer, wherein the managing includes:
        pinning data associated with a virtual address that maps to a portion of the system memory space associated with the far memory into the pin buffer by modifying an entry of a page table associated with the virtual address to map the virtual address to the pin buffer in response to a pin request indicating the virtual address; and
        unpinning data associated with the pin request from the pin buffer by modifying the entry to map the virtual address to a system memory address.

2. The method of claim 1, wherein the second portion of the near memory is a set associative cache and wherein the managing of the pin buffer includes allocating the pin buffer to a portion of sets.

3. The method of claim 1, wherein the near memory is an n-way, set associated cache and wherein the managing of the pin buffer includes allocating all n-ways of each set that is allocated in the pin buffer to a first way of the near memory.

4. The method of claim 1, wherein modifying the entry of the page table includes determining a near memory address by adding a physical address offset associated with the virtual address to a near memory pin buffer base address.

5. The method of claim 1, wherein the near memory includes a near memory tag array and further wherein the near memory tag array is indexed during accesses to the second portion of the near memory and wherein the near memory tag array is bypassed during accesses to the pin buffer.

6. The method of claim 1, wherein a near memory controller pins a portion of the pin buffer to cache a far memory address responsive to determining that the pin buffer portion is currently unused.

7. The method of claim 1, wherein the far memory is persistent storage.

8. The method of claim 7, wherein the far memory is random access storage.

9. The method of claim 1, wherein a memory configuration operation may be implemented by resources including:
   special control registers; and
   microcode.

10. A processor, comprising:
    a first memory controller to communicate with a first memory;
    a second memory interface to communicate with a second memory controller coupled to a second memory; and
    an execution unit, including memory configuration operation resources to:
       signal the first memory controller to:
          allocate a first portion of the first memory to a pin buffer and allocate a second portion of the first memory to a cache for the second memory;
          expand a system memory space having the second memory to include the pin buffer, responsive to a memory configuration operation;
          pin data associated with a virtual address that maps to a portion of the system memory space associated with the second memory into the pin buffer by modification of an entry of a page table associated with the virtual address to map the virtual address to the pin buffer, responsive to a pin request; and
          unpin data associated with the pin request from the pin buffer by modification of the entry to map the virtual address to a system memory address, wherein the first memory comprises a volatile memory and the second memory comprises a persistent storage.

11. The processor of claim 10, wherein the processor is to determine a first memory address by addition of a physical address offset associated with the virtual address to a first memory pin buffer base address.

12. The processor of claim 10, wherein the first memory includes a first memory tag array and further wherein the first memory tag array is to be indexed during accesses to the second portion of the first memory and wherein the first memory tag array is to be bypassed during accesses to the pin buffer.

13. The processor of claim 10, wherein the first memory controller is to pin a portion of the pin buffer to cache a second memory address responsive to a determination that the pin buffer portion is currently unused.

14. The processor of claim 10, wherein the second memory comprises a byte-addressable memory.

15. A system, comprising:
    first storage to store an operating system;
    a processor;
    a multiple tier main memory architecture including:
       a second memory having a second memory capacity, a second memory latency, and a second memory storage technology; and
       a first memory having a first memory capacity, a first memory latency, and a first memory storage technology, the second memory storage technology different than the first memory storage technology; and
    a first memory controller to:
       allocate a first portion of the first memory as a second memory cache;
       allocate, responsive to execution by the processor of a memory configuration operation, a second portion of the first memory as a pin buffer to occupy a portion of a physical address space addressable by the operating system, wherein the second memory comprises a remainder of the physical address space;
       expand the physical address space to include the pin buffer, and manage the pin buffer, wherein the pin buffer management includes:
          to pin data associated with a virtual address that maps to a portion of the physical address space into the pin buffer by modification of an entry of a page table associated with the virtual address to map the virtual address to the pin buffer in response to a pin request to indicate the virtual address; and
          to unpin data associated with the pin request from the pin buffer by modification of the entry to map the virtual address to a physical address.

16. The system of claim 15, wherein the second memory storage technology is a byte-addressable persistent storage technology.

17. The system of claim 16, wherein the second memory storage technology is a byte-addressable randomly accessible storage technology.

18. The system of claim 17, wherein the first memory storage technology is a volatile, random access storage technology.

19. The system of claim 15, wherein the processor includes a core cache and wherein a capacity of the first memory exceeds a capacity of the core cache by at least an order of magnitude and wherein a capacity of the second memory exceeds the capacity of the first memory by at least an order of magnitude.

20. The system of claim 15, wherein the second memory cache comprises a set associative cache including a cache tag array and wherein the pin buffer is to function as a tagless, fully associative cache.

21. The system of claim 20, further comprising a page table to map virtual addresses to physical addresses, wherein the page table is to map virtual addresses within a pin buffer portion of the physical address space to a pin buffer portion of the first memory.

22. The system of claim 15, wherein the second portion of the first memory is a set associative cache and wherein allocation of the pin buffer includes allocation of the pin buffer to a portion of sets.

23. The system of claim 22, wherein the first memory controller is operable to pin a reserved way of the pin buffer for the second memory cache responsive to a determination that the reserved way is currently unused by the pin buffer.

24. The system of claim 15, wherein the first portion of the first memory is not visible to the operating system.

* * * * *